Jan. 2, 1934.     E. G. BODEN     1,941,460
DOUBLE ROW ROLLER BEARING
Filed Nov. 14, 1932
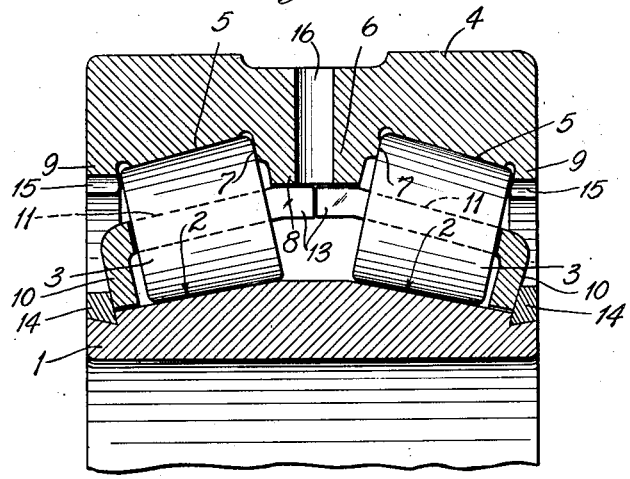
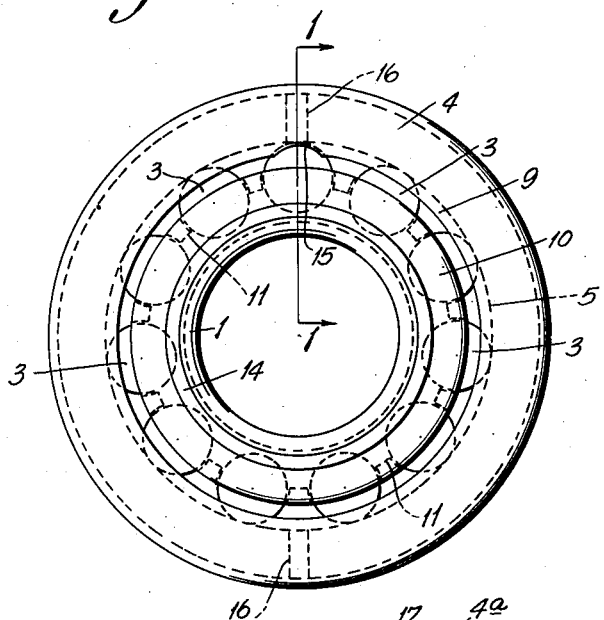
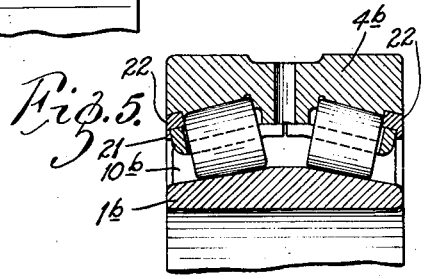
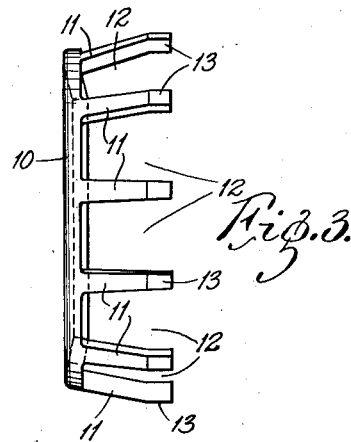
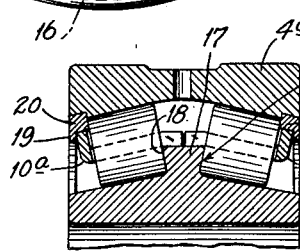
INVENTOR:
Ernest G. Boden
HIS ATTORNEYS.

Patented Jan. 2, 1934

1,941,460

UNITED STATES PATENT OFFICE 1,941,460

DOUBLE ROW ROLLER BEARING

Ernest G. Boden, Canton, Ohio, assignor to The Timken Roller Bearing Company, Canton, Ohio, a corporation of Ohio Application November 14, 1932
Serial No. 642,525

3 Claims. (Cl. 308—214)

My invention relates to double row roller bearings, particularly taper roller bearings and has for its principal object a self-contained bearing of this type, both of whose race members are of integral construction. Other objects and advantages will appear hereinafter.

The invention consists principally in a double row roller bearing wherein one of the race members is provided with ribs at each end of the rollers and the other race member is provided with rings disposed outwardly of the end flanges of the roller cages, thereby making the entire bearing self-contained and wherein both race members are of integral construction. The invention further consists in the double row roller bearing and in the parts and combinations and arrangements of parts hereinafter described and claimed.

In the accompanying drawing,

Fig. 1 is a partial sectional view of a double row roller bearing embodying my invention, Fig. 2 is an end elevation, Fig. 3 is an elevation of the roller cage, Fig. 4 is a view similar to Fig. 1 of a modified form of my invention, and Fig. 5 is a view similar to Fig. 1 of another modified form of my invention.

Double row taper roller bearings, particularly of the direct mounted type, wherein the large ends of the rollers are disposed inwardly, present a complicated assembling problem and have been thought to require that one of the race members be made in two parts. According to the present invention, each bearing is a one-piece member.

In Fig. 1 of the drawing is illustrated a double cone 1 or inner bearing member having two raceways 2 on each of which is mounted a series of rollers 3, the large ends of the rollers being disposed toward the middle of the bearing. A cup 4 or outer bearing member likewise has two conical raceways 5 for the two series of rollers. Around the middle of the inner periphery of the cup 4 is an annular rib 6 having thrust surfaces 7 for the large ends of the rollers. Said rib may have a portion 8 of reduced width projecting radially inwardly beyond the thrust surfaces.

The cup 4 is provided with flanges 9 at each outer end that constitute abutments or stops for the small ends of the rollers 3.

Each set of rollers 3 is provided with a cage including an outer end ring 10 from which extend fingers 11 that constitute the side walls of conical roller receiving pockets 12 that are open at their large ends. These fingers 11 constitute a cage body of conical form and their inner ends 13 are bent substantially parallel to the axis of the bearing so that they fit within the cylindrical surface formed around the inner periphery of the inwardly projecting portion 8 of the central thrust rib 6 of the cup. The inner periphery of the outer end ring 10 of each cage closely encircles the cone; so that the cage is closely guided at each end.

In order to hold the cages in place and hence to make the entire bearing a self-contained unit, rings 14 are mounted at the ends of the cone just beyond the end rings of the cages. These rings may be split rings snapped into a groove or they may be shrunk onto the cone or otherwise suitably secured in place.

The bearing is assembled after the fashion of a ball bearing, the cone being dropped to an extreme eccentric position in the cup and the rollers put into the space between the cup and the cone. In order to allow the insertion of the maximum number of rollers, each small cup flange may be provided with a filling slot 15. After the full quantity of rollers has been inserted, the rollers are properly spaced between the bearing members and the cages mounted in place, after which the cage securing rings 14 are mounted on the cone.

The cup may be provided with a lubricant passageway 16 through its central rib.

In the modified form of the invention shown in Fig. 4 of the drawing, instead of using a central thrust rib on the cup 4a, the double cone is provided with a central thrust rib 17 having thrust surfaces 18 for the large ends of the rollers; and the inner ends of the cage fingers fit around the cylindrical surface formed around the outer periphery of the central thrust rib 17 of the cone. The outer periphery of the outer end ring 10a of each cage encircles the cup and is held in place by an annular flange 19 provided on a split ring 20 snapped into a groove in the cup or otherwise attached thereto. The inner ends of the rings 20 also serve as thrust surfaces for the small ends of the rollers.

The construction of the modification shown in Fig. 5 is similar to that of the preferred form, except that the ends of the cone 1b are made plain, and the cage rings 10b are held in place by annular flanges 21 provided on rings 22 snapped into grooves in the ends of the cup 4b. The holding rings 22 also serve as thrust surfaces for the small ends of the rollers.

The hereinbefore described constructions are self-contained without the use of special retaining sleeves and the like required in the usual double row bearings wherein one of the bearing members is in two parts. The bearing is easily lubricated and it is very simple and inexpensive to manufacture.

Obviously, numerous changes may be made without departing from the invention; and I do not wish to be limited to the precise constructions shown.

What I claim is:

1. A double row roller bearing comprising an integral bearing cup, an integral bearing cone, each of said bearing members having two conical raceway portions, two series of conical rollers interposed between said cup and cone, said cup having a central rib provided with thrust surfaces engaged respectively by the large ends of said rollers, said cup also having an annular flange at each outer end, cages for said rollers, each cage including an outer end ring closely encircling said cone and inwardly projecting fingers forming roller receiving pockets opened at the middle of the bearing, and means at each end of said cone for retaining said cages in position.

2. A double row roller bearing comprising an integral bearing cup, an integral bearing cone, each of said bearing members having two conical raceway portions, two series of conical rollers interposed between said cup and cone, said cup having a central rib provided with thrust surfaces engaged respectively by the ends of said rollers, said cup also having an annular flange at each outer end, each of said flanges being provided with a filling slot, cages for said rollers, each cage including an outer end ring closely encircling said cone and inwardly projecting fingers forming roller receiving pockets opened at the middle of the bearing, and a ring secured on each end of said cone for retaining said cages in position.

3. A double row roller bearing comprising an integral bearing cup, an integral bearing cone, each of said bearing members having two conical raceway portions, two series of conical rollers interposed between said cup and cone, said cup having a central rib provided with thrust surfaces engaged respectively by the ends of said rollers, said rib also being provided with a portion of reduced width projecting radially inwardly beyond said thrust surfaces and having a cylindrical inner periphery, said cup also having an annular flange at each outer end, each of said flanges being provided with a filling slot, cages for said rollers, each cage including an outer end ring closely encircling said cone and inwardly projecting fingers forming roller receiving pockets opened at the middle of the bearing, the inner ends of said fingers extending parallel to the axis of the bearing and fitting closely in said rib, and means at each end of said cone for retaining said cages in position.

ERNEST G. BODEN.